United States Patent [19]

Matsushima

[11] Patent Number: 4,550,920
[45] Date of Patent: Nov. 5, 1985

[54] OIL SEAL WITH MAIN LIP, SUBSIDIARY LIP AND DUST LIP

[75] Inventor: Noboru Matsushima, Fukushima, Japan

[73] Assignee: Nippon Oil Seal Industry Co., Ltd., Tokyo, Japan

[21] Appl. No.: 648,661

[22] Filed: Sep. 10, 1984

[30] Foreign Application Priority Data

May 17, 1984 [JP] Japan ............................ 59-73683[U]

[51] Int. Cl.⁴ .............................................. F16J 15/32
[52] U.S. Cl. ..................................... 277/134; 277/153; 277/166
[58] Field of Search ...................... 277/35, 37, 50, 134, 277/152, 153, 166

[56] References Cited

U.S. PATENT DOCUMENTS

| 3,511,512 | 5/1970 | Wheelock | 277/153 X |
| 3,746,351 | 7/1973 | Tucker | 277/153 |
| 4,327,922 | 5/1982 | Walther | 277/153 X |

FOREIGN PATENT DOCUMENTS

| 972155 | 5/1959 | Fed. Rep. of Germany | 277/152 |
| 2107648 | 8/1971 | Fed. Rep. of Germany | 277/153 |
| 2736207 | 2/1979 | Fed. Rep. of Germany | 277/134 |

*Primary Examiner*—Robert S. Ward
*Attorney, Agent, or Firm*—Peter L. Berger

[57] ABSTRACT

An oil seal disposed between a housing and a rotating shaft received in the hollow inside of the housing so as to prevent a liquid in the housing from leaking to the outside. The oil seal has a first metal ring and a second metal ring. The first metal ring is secured at the outer peripheral portion thereof to the housing and is provided at the inner peripheral portion thereof with an annular seal lip which is in slide contact with the outer peripheral surface of the rotating shaft thereby to seal the liquid in the housing. The second metal ring is connected at the outer peripheral portion thereof to the outer peripheral portion of the first metal ring and is separated at the inner peripheral portion thereof from the inner peripheral portion of the first metal ring in the axial direction of the rotating shaft so as to form an annular space in cooperation with the first metal ring. The second metal ring further has a dust lip which is in slide contact with the outer peripheral surface of the rotating shaft. The seal lip is constituted by a main lip located on the side thereof which is closer to the liquid to be sealed and a subsidiary lip located on the side thereof which is closer to the dust lip. Further, the dust lip is provided in its slide contact surface for slide contact with the rotating shaft with a circumferentially continuous groove.

14 Claims, 4 Drawing Figures

OIL SEAL WITH MAIN LIP, SUBSIDIARY LIP AND DUST LIP

BACKGROUND OF THE INVENTION

1. Field of the Invention

The present invention relates to an oil seal which is disposed at the boundary portion between the inside and outside of a machine, for example, agricultural machinery, in order to prevent intrusion of external muddy watter, dust or other foreign matter into the machine and further prevent a lubricating oil, for example, in the machine from leaking to the outside.

2. Description of the Prior Art

A known oil seal of the type described above is constructed as follows: As shown in FIG. 1, a metal ring 102 of L-shaped cross-section is fitted at its outer peripheral portion to a machine housing 101. A seal lip 105 having a main lip 103 and a dust lip 104 is secured to the inner peripheral portion of the metal ring 102. The respective distal ends of the main lip 103 and the dust lip 104 are brought into slide contact with the outer peripheral surface of a rotating shaft 106 received in the housing 101. Thus, the main lip 103 serves to prevent a liquid, such as a lubricating oil, in the housing 101 from leaking to the outside. On the other hand, the dust lip 104, which is disposed on the side of the seal lip 105 which is closer to the atmosphere side, serves to prevent foreign matter, such as external water or dust in the air, from entering the inside of the housing 101. Moreover, grease is filled in a space 107 defined by the main lip 103, the dust lip 104 and the rotating shaft 106 so as to lubricate the area of slide contact between the main lip 103 and the dust lip 104 on one hand and the rotating shaft 106 on the other.

The above-described conventional oil seal, however, suffers the following problems: It is difficult to bring the inner peripheral edge of the dust lip 104 into close contact with the outer peripheral surface of the rotating shaft 106 over the entire circumference thereof owing to, for example, manufacturing errors. Accordingly, it is not possible to satisfactorily prevent intrusion of external dust or water. In addition, since the space 107 defined by the main lip 103, the dust lip 104 and the rotating shaft 106 has a relatively small volume, the grease filled in the space 107 inconveniently disappears within a short period of time, which causes the dust lip 104 to become worn quickly, resulting disadvantageously in a reduction in the life thereof.

SUMMARY OF THE INVENTION

The present invention aims at overcoming the above-described problems of the prior art.

It is, accordingly, an object of the present invention to provide an oil seal which has excellent dust protecting efficiency and is capable of preventing the intrusion of external dust and water over a long period of time.

It is another object of the present invention to provide an oil seal which effectively lubricates the dust lip over a long period of time and consequently allows the life of the dust lip to be greatly prolonged.

To these ends, according to the invention, there is provided an oil seal comprising: a first metal ring which is secured at either one of the outer and inner peripheral portions thereof to either one of the housing and the rotating shaft and is provided at the other of the outer and inner peripheral portions thereof with an annular seal lip which is in slide contact with either the outer peripheral surface of the rotating shaft or the inner peripheral surface of the housing thereby to seal a liquid in the housing; and a second metal ring which is connected at either one of the outer and inner peripheral portions thereof to the first metal ring and is separated at the other of the outer and inner peripheral portions thereof from the first metal ring in the axial direction of the rotating shaft so as to form an annular space in cooperation with the first metal ring, the second metal ring further having a dust lip which is in slide contact with either the outer peripheral surface of the rotating shaft or the inner peripheral surface of the housing. The seal lip is constituted by a main lip located on the side thereof which is closer to the liquid to be sealed and a subsidiary lip located on the side thereof which is closer to the dust lip. Further, the dust lip is provided in its surface for slide contact with the rotating shaft or the housing with a circumferentially continuous groove.

According to one embodiment of the invention, the circumferentially continuous groove formed in the slide contact surface of the dust lip is constituted by a helical thread groove.

According to another embodiment of the invention, the circumferentially continuous groove is constituted by a plurality of annular grooves which are separate from each other in the axial direction of the rotating shaft.

By virtue of the above-described groove configuration, any dust or water which would enter the inside of the housing from the outside through the dust lip is pushed out from the groove to the outside by the screw-pump effect or the labyrinth effect offered by the helical thread groove or the annular grooves on the dust lip. Therefore, the intrusion of these foreign substances into the housing is effectively prevented.

Moreover, if the slide contact surface of the dust lip is constituted by a conical taper surface which diverges or converges toward the atmosphere side, then it becomes easier to push out, by the rotation of the rotating shaft, foreign matter, such as external dust or water, entering the area between the slide contact surface of the dust lip and the outer peripheral surface of the rotating shaft or the inner peripheral surface of the housing.

Furthermore, the grease filled in the annular space with a relatively large volume which is formed by the first and second metal rings makes it possible to lubricate the slide contact surface of the dust lip and that of the subsidiary lip of the seal lip over a long period of time. Accordingly, it is possible to prevent wearing of these slide contact surfaces and to ensure the functions of the dust lip and the subsidiary lip over a long period of time.

If a flex waist portion is formed on the dust lip between the distal portion thereof and the proximal portion thereof which is secured to the second metal ring, even in the case where the center of the dust lip and the central axis of the rotating shaft are somewhat offset from each other, an elastic flex action of the waist portion of the dust lip allows the slide contact surface of the dust lip to come in close contact with the outer peripheral surface of the rotating shaft or the inner peripheral surface of the housing. Accordingly, it is possible to improve the dust protecting efficiency of the dust lip.

Additionally, if an annular spring is attached to the side of the dust lip which is opposite to the slide contact surface thereof, the annular spring makes it possible to resiliently press the slide contact surface of the dust lip against the outer peripheral surface of the rotating shaft or the inner peripheral surface of the housing over the entire circumference thereof. Thus, it is possible to improve the dust protecting efficiency of the dust lip.

The above and other objects, features and advantages of the invention will become clear from the following description of the preferred embodiments thereof, taken in conjunction with the accompanying drawings.

DESCRIPTION OF THE PREFERRED EMBODIMENTS

Embodiments of the oil seal in accordance with the present invention will be described hereinunder with reference to the accompanying drawings.

Figure 1:
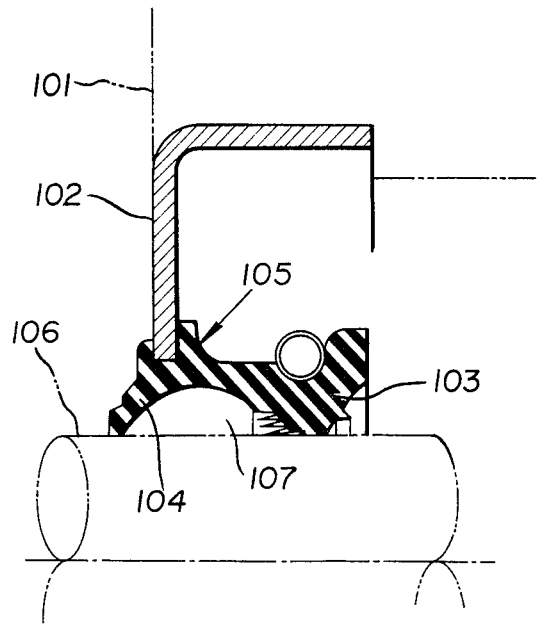
FIG. 1 is a vertical sectional side elevational view of a conventional oil seal.
Figure 2:
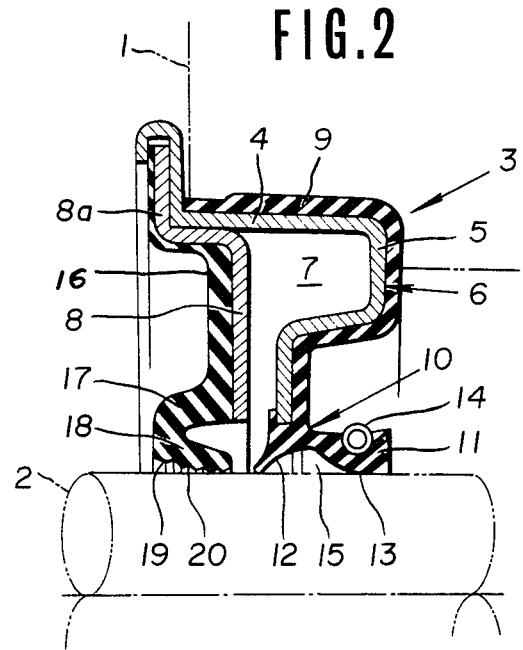
FIGS. 2 to 4 are vertical sectional side elevational views respectively showing various embodiments of the oil seal in accordance with the present invention.

Referring first to FIG. 2 which shows a first embodiment of the invention, the reference numeral 1 denotes a housing, such as a machine frame or the like, which is provided in the hollow side thereof with a rotating shaft 2. Between the housing 1 and the rotating shaft 2 is provided an oil seal 3 in accordance with the invention. The oil seal 3 has a first metal ring 6 and a second metal ring 8. The first metal ring 6 has a cylindrical outer peripheral portion 4 and a bent radial portion 5 which extends radially inward from the outer peripheral portion 4. The second metal ring 8 has its outer peripheral portion 8a caulked by the outer peripheral portion 4 of the first metal ring 6. The second metal ring 80 extends radially inward while facing the radial portion 5 of the first metal ring 6 such as to define an annular space 7 in cooperation with the radial portion 5. The outer peripheral portion 4 of the first metal ring 6 is attached to the housing 1 through an elastic material 9, such as rubber, which is secured to the surface of the outer peripheral portion 4 by, for example, baking.

An elastic material 9 is secured to one of the surfaces of the first metal ring 6 substantially all over the surface. The elastic material 9 is integrally formed at its inner peripheral portion with an annular seal lip 10. The seal lip 10 is secured to the inner peripheral edge of the first metal ring 6. The seal lip 10 has a main lip 11 located on the side thereof which is closer to a liquid to be sealed, such as a lubricating oil, and a subsidiary lip 12 located on the side thereof which is closer to the atmosphere side. The main lip 11 has on the inner peripheral side thereof a seal edge 13 of substantially V-shaped cross-section. The seal edge 13 is brought into resilient contact with the outer peripheral surface of the rotating shaft 2 by means of an annular spring 14 which is provided on the outer peripheral side of the seal edge 13.

Further, an annular small space 15 is formed between the main lip 11, the subsidiary lip 12 and the rotating shaft 2. The small space 15 is filled with grease which lubricates the respective slide portions of the main lip 11 and the subsidiary lip 12.

On the other hand, an elastic material 16, such as rubber, is secured to the outer surface of the second metal ring 8 which faces the atmosphere by, for example, baking. The elastic material 16 is integrally formed at the inner peripheral portion thereof with a dust lip 18 which has a flex waist portion 17 and extends radially inward from the inner peripheral portion of the second metal ring 8. The dust lip 18 has a slide contact surface 19 which is in slide contact with the rotating shaft 2. The slide contact surface 19 is constituted by a conical taper surface which diverges toward the atmosphere side. Further, the slide contact surface 19 is provided with a circumferentially continuous groove 20. In the embodiment shown in FIG. 2, the groove 20 is constituted by a helical thread groove. In this case, the thread groove cutting direction is determined in relation to the rotational direction of the rotating shaft 2 so that, when the rotating shaft 2 rotates, a screw-pump action is produced such as to push back any external dust. For example, in the case where the rotating shaft 2 rotates clockwise as viewed from the atmosphere side, a right-hand thread groove is formed; in the case where the rotating shaft 2 rotates counterclockwise, a left-hand thread groove is formed. Moreover, the groove 20 may be constituted by, although not shown, a plurality of annular grooves which are separate from each other in the axial direction of the rotating shaft 2. In this case, the annular grooves are designed such that the grooves gradually increase in diameter toward the atmosphere side and the diameter of an annular groove closer to the annular space 7 is made slightly smaller than the diameter of the rotating shaft 2. Thus, the intrusion of external dust or water is blocked by the labyrinth effect offered by the annular grooves disposed in parallel in the axial direction of the rotating shaft 2.

The relatively large annular space 7 formed between the first and second metal rings 6, 8 is filled with grease which mainly lubricates the portion of the dust lip 18 which is in slide contact with the rotating shaft 2.

The following is a description of the operation of the above-described embodiment.

The liquid to be sealed, such as a lubricating oil, filled in the housing 1 is prevented from leaking to the atmosphere side by the main lip 11 which is resiliently pressed against the rotating shaft 2 by the annular spring 14 provided on the outer periphery of the seal lip 10. If the lubricating oil should leak out through the main lip 11 into the small space 15 between the main lip 11 and the subsidiary lip 12, the leakage oil will be prevented from leaking to the atmosphere side by the subsidiary lip 12.

On the other hand, foreign matter, such as external dust or water, is prevented from entering the inside of the housing 1 by the dust lip 18 which is in resilient contact with the rotating shaft 2. If foreign matter should pass the dust lip 18, the foreign matter will be reliably prevented by the subsidiary lip 12 from entering the inside of the housing 1 filled with the lubricating oil.

When the rotating shaft 2 is rotating, the grease in the annular small space 15 between the main lip 11 and the subsidiary lip 12 lubricates the respective slide portions of the main and subsidiary lips 11, 12. On the other hand, the slide contact surface 19 of the dust lip 18 is lubricated by the grease in the relatively large annular space 7 between the first and second metal rings 6, 8. In this case, after the grease in the small space 15 with a relatively small volume has disappeared, the subsidiary lip 12 is lubricated by the grease in the annular space 7 with a relatively large volume. Therefore, there is no possibility that the subsidiary lip 12 may become worn within a short period of time to impair its function. Further, since intrusion of external dust or other foreign matter is substantially blocked by the dust lip 18, there is also no possibility that the slide portion of the subsidiary lip 12 may be abnormally worn by external dust or other foreign matter.

Moreover, foreign matter, such as external dust or muddy water, is effectively prevented from entering the inner side of the dust lip 18 or is pushed back to the outside by the labyrinth effect and a kind of screw-pump effect offered by the groove 20 formed in the slide contact surface 19 of the dust lip 18 with the rotation of the rotating shaft 2. Accordingly, the oil seal in accordance with the invention is able to show a stable seal effect over a long period of time even under severe conditions where the oil seal is exposed to much foreign matter, such as dust or muddy water.

Figure 3:
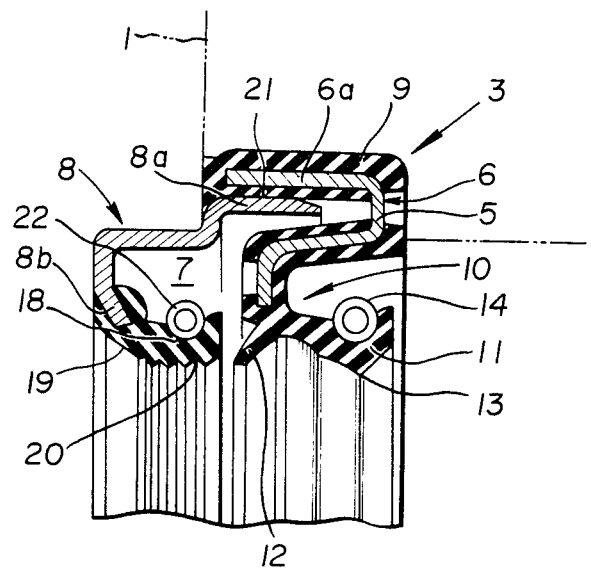
Figure 4:
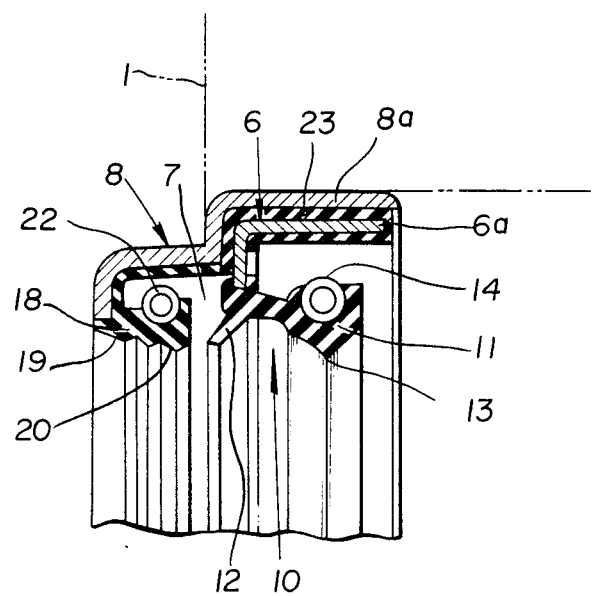

FIGS. 3 and 4 respectively show second and third embodiments of the present invention, in which the members or portions similar or corresponding to those in the above-described first embodiment are denoted by the same reference numerals.

In the embodiment shown in FIG. 3, the second metal ring 8 is fitted at its cylindrical outer peripheral portion 8a to the inside of a cylindrical outer peripheral portion 6a of the first metal ring 6 through an elastic material 21. Further, similar to that in the first embodiment, the dust lip 18 provided at the inner peripheral portion 8b of the second metal ring 8 has the circumferentially continuous groove 20 formed in the slide contact surface 19 thereof which is in slide contact with the rotating shaft (not shown). Moreover, the slide contact surface 19 is resiliently pressed against the outer peripheral surface of the rotating shaft 2 by an annular spring 22 which is provided on the outer peripheral side of the slide contact surface 19. The construction and operation of each of the members in this embodiment other than the above-described are substantially similar to those in the first embodiment.

In the embodiment shown in FIG. 4, the first metal ring 6 of substantially L-shaped cross-section is provided at its inner peripheral portion with the seal lip 10 having the main lip 11 and the subsidiary lip 12, similarly to the first embodiment. Moreover, the second metal ring 8 of staircase-shaped cross-section is provided at its inner peripheral portion with the dust lip 18 which has the circumferentially continuous groove 20 formed in the slide contact surface 19 thereof on its inner peripheral side, similarly to the second embodiment. The slide contact surface 19 is resiliently pressed against the outer peripheral surface of the rotating shaft (not shown) by the annular spring 22 which is disposed on the outer peripheral side of the dust lip 18. Further, the second metal ring 8 is fitted at its cylindrical outer peripheral portion 8a to the housing 1. In addition, to the inner surface of the second metal ring 8 is bonded a support portion 23 of an elastic material which is integrally formed with the dust lip 18. Through the support portion 23, the cylindrical outer peripheral portion 6a of the first metal ring 6 is fitted to the inner side of the cylindrical outer peripheral portion 8a of the second metal ring 8. The construction and operation of each of the members or portions of this embodiment other than the above-described are substantially similar to those of the first embodiment.

It is to be noted that, although in the above-described embodiments, the seal lip 10 and the dust lip 18 are respectively provided at the inner peripheral portions of the first and second metal rings 6, 8, it is a matter of course that, if necessary, the seal lip 10 and the dust lip 18 may be respectively provided at the outer peripheral portions of the first and second metal rings 6, 8 which are fitted on the rotating shaft 2 at their inner peripheral portions. In such case, the first and second metal rings 6, 8 are connected together at their inner peripheral portions but are separated from each other at their outer peripheral portions in the axial direction of the rotating shaft 2. Further, if necessary, the dust lip 18 may be resiliently pressed against the inner peripheral surface of the housing 1 by the annular spring 22 which is disposed on the inner peripheral side of the dust lip 18. Furthermore, the slide contact surface 19 of the dust lip 18 may be constituted by a conical taper surface which converges toward the atmosphere side. If necessary, the dust lip 18 may be provided with the flex waist portion 17 between the outer peripheral edge thereof and the portion thereof which is secured to the outer peripheral portion of the second metal ring 18.

What is claimed is:

1. An oil seal which is disposed between a housing and a rotating shaft received in the hollow inside of said housing so as to prevent a liquid in said housing from leaking to the outside, said oil seal comprising:

a first metal ring which is secured at the outer peripheral portion thereof to said housing and is provided at the inner peripheral portion thereof with an annular seal lip which is in slide contact with the outer peripheral surface of said rotating shaft thereby to seal said liquid in said housing; and a second metal ring which is connected at the outer peripheral portion thereof to the outer peripheral portion of said first metal ring and is separated at the inner peripheral portion thereof from the inner peripheral portion of said first metal ring in the axial direction of said rotating shaft so as to form an annular space in cooperation with said first metal ring, said second metal ring further having a dust lip which is in slide contact with the outer peripheral surface of said rotating shaft, wherein said seal lip is constituted by a main lip located on the side thereof which is closer to said liquid to be sealed and a subsidiary lip located on the side thereof which is closer to said dust lip, and said dust lip is provided in its slide contact surface for slide contact with said rotating shaft with a circumferentially continuous groove.

2. An oil seal according to claim 1, wherein said circumferentially continuous groove formed in the slide contact surface of said dust lip is constituted by a helical thread groove.

3. An oil seal according to claim 1, wherein said circumferentially continuous groove formed in the slide contact surface of said dust lip is constituted by a plurality of annular grooves which are provided such as to be separate from each other in the axial direction of said rotating shaft.

4. An oil seal according to claim 1, wherein the slide contact surface of said dust lip is constituted by a conical taper surface which diverges toward the atmosphere side.

5. An oil seal according to claim 1, wherein grease is filled in the annular space formed between said first and second metal rings.

6. An oil seal according to claim 1, wherein said dust lip has a flex waist portion between the inner peripheral edge thereof and the portion thereof which is secured to the inner peripheral portion of said second metal ring.

7. An oil seal according to claim 1, wherein an annular spring is attached to the outer peripheral side of said dust lip.

8. An oil seal which is disposed between a housing and a rotating shaft received in the hollow inside of said housing so as to prevent a liquid in said housing from leaking to the outside, said oil seal comprising:

a first metal ring which is secured at the inner peripheral portion thereof to said rotating shaft and is provided at the outer peripheral portion thereof with an annular seal lip which is in slide contact with the inner peripheral surface of said housing thereby to seal the liquid in said housing; and a second metal ring which is connected at the inner peripheral portion thereof to the inner peripheral portion of said first metal ring and is separated at the outer peripheral portion thereof from the outer peripheral portion, of said first metal ring in the axial direction of said rotating shaft so as to form an annular space in cooperation with said first metal ring, said second metal ring further having a dust lip which is in slide contact with the inner peripheral surface of said housing, wherein said seal lip is constituted by a main lip located on the side thereof which is closer to said liquid to be sealed and a subsidiary lip located on the side thereof which is closer to said dust lip, and said dust lip is provided in its slide contact surface for slide contact with said housing with a circumferentially continuous groove.

9. An oil seal according to claim 8, wherein said circumferentially continuous groove formed in the slide contact surface of said dust lip is constituted by a helical thread groove.

10. An oil seal according to claim 8, wherein said circumferentially continuous groove formed in the slide contact surface of said dust lip is constituted by a plurality of annular grooves which are provided such as to be separate from each other in the axial direction of said rotating shaft.

11. An oil seal according to claim 8, wherein the slide contact surface of said dust lip is constituted by a conical taper surface which converges toward the atmosphere side.

12. An oil seal according to claim 8, wherein grease is filled in the annular space formed between said first and second metal rings.

13. An oil seal according to claim 8, wherein said dust lip has a flex waist portion between the outer peripheral edge thereof and the portion thereof which is secured to the outer peripheral portion of said second metal ring.

14. An oil seal according to claim 8, wherein an annular spring is attached to the inner peripheral side of said dust lip.

* * * * *